United States Patent
Yuza et al.

(10) Patent No.: US 8,322,130 B2
(45) Date of Patent: Dec. 4, 2012

(54) METHOD FOR CONTROLLING EXHAUST GAS PURIFICATION SYSTEM AND EXHAUST GAS PURIFICATION SYSTEM

(75) Inventors: Hiroyuki Yuza, Fujisawa (JP); Teruo Nakada, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 325 days.

(21) Appl. No.: 12/735,710

(22) PCT Filed: Nov. 27, 2008

(86) PCT No.: PCT/JP2008/071494
§ 371 (c)(1),
(2), (4) Date: Aug. 11, 2010

(87) PCT Pub. No.: WO2009/107298
PCT Pub. Date: Sep. 3, 2009

(65) Prior Publication Data
US 2010/0307132 A1 Dec. 9, 2010

(30) Foreign Application Priority Data
Feb. 27, 2008 (JP) .................................. 2008-046456

(51) Int. Cl.
*F01N 3/00* (2006.01)
(52) U.S. Cl. ................. 60/286; 60/274; 60/295; 60/301
(58) Field of Classification Search ...................... 60/286
See application file for complete search history.

(56) References Cited

U.S. PATENT DOCUMENTS

| | | | |
|---|---|---|---|
| 7,207,171 B2 * | 4/2007 | Nagaoka et al. | 60/295 |
| 2004/0149255 A1 * | 8/2004 | zur Loye et al. | 123/295 |
| 2005/0150212 A1 * | 7/2005 | Pfaeffle et al. | 60/286 |
| 2005/0217245 A1 * | 10/2005 | Haseyama et al. | 60/278 |
| 2009/0145115 A1 * | 6/2009 | Torisaka | 60/286 |
| 2010/0132334 A1 * | 6/2010 | Duclos et al. | 60/286 |

FOREIGN PATENT DOCUMENTS

JP  6-336914  12/1994
(Continued)

OTHER PUBLICATIONS

Patent Abstract of Japan, Publication No. 06-336914, Published Dec. 6, 1994.
(Continued)

*Primary Examiner* — Thomas Denion
*Assistant Examiner* — Jason Shanske
(74) *Attorney, Agent, or Firm* — Staas & Halsey LLP (57) ABSTRACT

When the operating state of an internal combustion engine (10) is under low load, the supply of unburned fuel is controlled by using post-injection without using in-exhaust-pipe direct injection. Under medium load, the supply of the unburned fuel is controlled by using both the post-injection and the in-exhaust-pipe direct injection. Under high load, the supply of the unburned fuel is controlled by using the in-exhaust-pipe direct injection without using the post-injection. Thus, in air-fuel ratio rich control performed during regeneration to recover the purification capability of an exhaust gas purification apparatus, both black smoke and white smoke are reduced when the supply of the unburned fuel for supplying the unburned fuel into exhaust gas is controlled.

8 Claims, 4 Drawing Sheets

FOREIGN PATENT DOCUMENTS

| | | |
|---|---|---|
| JP | 10-061464 | 3/1998 |
| JP | 2003-120392 | 4/2003 |
| JP | 2003-172185 | 6/2003 |
| JP | 2007-170218 | 7/2007 |

OTHER PUBLICATIONS

Patent Abstract of Japan, Publication No. 10-061464, Published Mar. 3, 1998.

Patent Abstract of Japan, Publication No. 2003-120392, Published Apr. 23, 2003.

Patent Abstract of Japan, Publication No. 2003-172185, Published Jun. 6, 2003.

Patent Abstract of Japan, Publication No. 2007-170218, Published Jul. 5, 2007.

International Search Report dated Dec. 22, 2008 in PCT/JP2008/071494.

* cited by examiner

METHOD FOR CONTROLLING EXHAUST GAS PURIFICATION SYSTEM AND EXHAUST GAS PURIFICATION SYSTEM

This application claims the benefit under U.S.C. Section 371, of PCT International Application No. PCT/JP2008/071494, filed Nov. 27, 2008 and Japanese Application No. 2008-046456 filed Feb. 27, 2008, the contents of which are incorporated herein by reference.

TECHNICAL FIELD

The present invention relates to a method for controlling an exhaust gas purification system and an exhaust gas purification system with which both white smoke and black smoke are reduced when the supply of unburned fuel is controlled for air-fuel ratio rich control or the like during regeneration of a NOx occlusion reduction type catalyst, a diesel particulate filter (DPF), or the like.

BACKGROUND ART

In order to reduce an amount of NOx emitted from an internal combustion engine mounted on a vehicle to the atmosphere, a NOx occlusion reduction type catalyst (LNT: Lean NOx Trap) has been used as a NOx lessening catalyst. This NOx occlusion reduction type catalyst occludes NOx when the exhaust gas is in a lean air-fuel ratio. Meanwhile, in a rich air-fuel ratio, this NOx occlusion reduction type catalyst releases the occluded NOx, and reduces the released NOx in a reducing atmosphere, for lessening NOx.

In order to release and reduce the NOx occluded in such a NOx occlusion reduction type catalyst for regeneration, the NOx occlusion reduction type catalyst needs to be exposed to a reducing atmosphere. For this reason, although a diesel engine normally operates in a lean state, an air-fuel ratio rich control is performed for making the exhaust gas temporarily into a rich state by changing an operating state of the internal combustion engine in order to regenerate the NOx occlusion reduction type catalyst.

Diesel particulate filters (DPF) are used to collect PMs (particulate matters) in exhaust gas. When an amount of PMs collected in such a DPF increases, the temperature of the DPF is raised to a combustion temperature of the PMs for removal of the PMs by combustion. For the removal by combustion of PMs by raising the temperature of DPF, a temperature raising control of exhaust gas is performed. In this temperature raising control of exhaust gas, an air-fuel ratio rich control is performed.

For implementation of the air-fuel ratio rich control, an unburned fuel supply control is performed in many cases. The supply control of unburned fuel employs a post-injection control for performing post-injection after main injection in an in-cylinder fuel injection control, and an in-exhaust-pipe direct injection control for injecting fuel directly into the exhaust pipe from a fuel (reducing agent) injection apparatus provided to the exhaust pipe.

For example, Japanese patent application Kokai publication No. 2007-170218 discloses an exhaust gas purifying system for an internal combustion engine including, for an NOx reduction control with a NOx storage and reduction catalyst: rich purge means for temporarily shifting an air/fuel ratio of the exhaust gas emitted from an internal combustion engine into a rich range by increasing fuel combusted in a cylinder; and fuel adding means for supplying the unburned fuel to the catalyst by injecting the unburned fuel into the exhaust gas. In the exhaust gas purifying system for an internal combustion engine, the rich purge means and the fuel adding means are selectively used, and any one of in-exhaust-pipe direct injection by a fuel addition valve provided on an upstream side of the catalyst and post-injection in which injection is performed after main injection is used as the fuel adding means.

However, in a case of the post-injection, the amount of fuel injected by the post-injection is too small to make the atmosphere of the catalyst reach a reducing atmosphere. Hence, a large-amount EGR (exhaust gas recirculation) is performed simultaneously with the post-injection. When this large-amount EGR is performed under a high load state and in a case where a combustion temperature in the engine is high, a problem is caused that the concentration of oxygen, which is required for combustion of the main injection, becomes low, and combustion in the cylinder is impaired, resulting in generation of black smoke.

Meanwhile, in a case of the in-exhaust-pipe direct injection, the amount of the injected fuel is sufficient to make the atmosphere of the catalyst reach a reducing atmosphere. Hence, no large-amount EGR is performed. However, when the in-exhaust-pipe direct injection is preformed under low load state and in a case where the catalyst temperature is low, the catalyst is not activated, and hence the fuel in an unchanged state passes (slips) through the catalyst. For this reason, there is a problem that the unburned fuel is emitted to the atmosphere in an unchanged state, and white smoke is generated.

New Long-Term Exhaust Emission Regulations for automobiles place importance on reduction of such white smoke and black smoke, as well as on tightening of regulations for PMs. Accordingly, the reduction of white smoke and black smoke has been an important issue.

Patent Document 1: Japanese patent application Kokai publication No. 2007-170218

DISCLOSURE OF THE INVENTION

Problems to be Solved by the Invention

The present invention has been made in view of the above-described situations. An object of the present invention is to provide a method for controlling an exhaust gas purification system and an exhaust gas purification system which are capable of reducing both black smoke and white smoke when the supply of unburned fuel is controlled for supplying the unburned fuel into exhaust gas, in an air-fuel ratio rich control performed during regeneration to recover the purification capability of the exhaust gas purification apparatus.

Means for Solving the Problems

To achieve the above object, a method for controlling an exhaust gas purification system is characterized by including an exhaust gas purification apparatus in which exhaust gas of an internal combustion engine is purified when the exhaust gas is in a lean air-fuel ratio state, and in which purification capability is regenerated when the exhaust gas is in an rich air-fuel ratio state, the method for controlling an exhaust gas purification system performing, in a supply control of unburned fuel for making the exhaust gas into a rich air-fuel ratio state, both post-injection by which post-injection is performed as in-cylinder injection and in-exhaust-pipe direct injection by which fuel is injected directly into the exhaust pipe.

In this method for controlling an exhaust gas purification system, when an operating state of the internal combustion engine is under low load, the supply of the unburned fuel is controlled by using the post-injection without using the in-exhaust-pipe direct injection, when the operating state of the internal combustion engine is under medium load, the supply of the unburned fuel is controlled by using both the post-injection and the in-exhaust-pipe direct injection, when the operating state of the internal combustion engine is under high load, the supply of unburned fuel is controlled by using the in-exhaust-pipe direct injection without using the post-injection.

Moreover, in the supply control of the unburned fuel under medium load, a target addition amount of unburned fuel to be added for making the exhaust gas into a rich air-fuel ratio state is calculated by dividing an intake air amount by a target air-fuel ratio calculated from the operating state of the internal combustion engine, and by then subtracting, from the divided value, a fuel flow amount required depending on the operating state of the internal combustion engine, a post-injection amount is calculated by calculating an addition amount ratio, which is a ratio between the post-injection amount and an in-exhaust-pipe direct injection amount, from the operating state of the internal combustion engine, and by then multiplying the target addition amount by the addition amount ratio, the in-exhaust-pipe direct injection amount is calculated by subtracting the post-injection amount from the target addition amount, and the unburned fuel is supplied in the calculated post-injection amount and the calculated in-exhaust-pipe direct injection amount.

This post-injection refers to an injection control in which unburned fuel is added and supplied into an exhaust pipe, and the fuel is injected into a cylinder, but not combusted in the cylinder, and then the fuel in the unburned state flows into the exhaust pipe. The post-injection differs from multi injection (multi-stage delayed injection) in which injected fuel is combusted in the cylinder and contributes to the temperature rise of the exhaust gas emitted from the cylinder. Moreover, the post-injection differs from the in-exhaust-pipe direct injection in that the fuel injected by the in-exhaust-pipe fuel injection does not pass the inside of the cylinder having a high temperature, but fuel injected by the post-injection passes the inside of the cylinder.

In this post-injection, the fuel is injected into a cylinder in an atmosphere having a temperature higher than that in a case of the exhaust pipe injection, the fuel is decomposed to some extent, and supplied as HC gas to the catalysts and the like. Hence, a state is achieved in which the fuel is easily combusted even when the catalyst is at a low temperature. Therefore, in a case where an exhaust gas temperature is low, i.e., under low load or the like, the post-injection is more advantageous than the in-exhaust-pipe direct injection in terms of catalytic reaction.

In contrast, since the temperature in the cylinder is high under high load, the fuel by the post-injection goes beyond the generation of HC gas, and oxidation and combustion reaction is promoted. In such a case, when an oxygen concentration in the cylinder is low because of EGR or the like, incomplete combustion occurs, generating black smoke.

Meanwhile, specific examples of the exhaust gas purification apparatus of the present invention include filter apparatuses such as a catalyst apparatus in which a NOx occlusion reduction type catalyst is supported, a diesel particulate filter, and a diesel particulate filter in which a catalyst is supported.

In this control method, the in-exhaust-pipe direct injection is not used under low load. As a result, it is possible to decompose the fuel to some extent, i.e., to convert the fuel into HC gas, while generation of white smoke is avoided. Thereby, the catalytic reaction can be promoted. Meanwhile, no post-injection is used under high load. As a result, generation of black smoke due to incomplete combustion in a cylinder can be avoided. Moreover, under medium load, the post-injection amount and the in-exhaust-pipe direct injection amount are found from the addition amount ratio calculated from the operating state of the internal combustion engine. For this reason, while generation of both black smoke and white smoke is suppressed, the unburned fuel can be supplied.

In the above method for controlling an exhaust gas purification system, the addition amount ratio is set on the basis of a limit within which no generation of black smoke occurs when an EGR control and a post-injection control are simultaneously performed.

In this method, the unburned fuel supplied to the catalyst by the post-injection is decomposed to some extent, to become reactive HC gas. Hence, the fuel reacts on the catalyst rapidly. Meanwhile, the unburned fuel supplied to the catalyst by the in-exhaust-pipe injection is first decomposed on the catalyst, and then reacts. Hence, an atmosphere of a higher temperature is required, and the catalytic reaction is slow. In this method, the post-injection is performed preferentially to the in-exhaust-pipe direct injection. Hence, while generation of black smoke is avoided, the unburned fuel can be catalytically reacted efficiently.

In the above method for controlling an exhaust gas purification system, the exhaust gas purification apparatus includes a NOx occlusion reduction type catalyst apparatus and an oxidation catalyst apparatus on an upstream side of the NOx occlusion reduction type catalyst apparatus, when a first temperature indicative of a catalyst temperature of the NOx occlusion reduction type catalyst apparatus is at or below a predetermined first temperature threshold, the post-injection is prohibited, when the first temperature is at or below a predetermined second temperature threshold, and a second temperature indicative of a catalyst temperature of the oxidation catalyst apparatus is at or below a predetermined third temperature threshold, the in- exhaust-pipe direct injection is prohibited, and the predetermined first temperature threshold is set to a temperature at which the unburned fuel injected by the post-injection reacts on a NOx occlusion reduction type catalyst, the predetermined second temperature threshold is set to a temperature at which the unburned fuel injected by the in-exhaust-pipe direct injection reacts on a NOx occlusion catalyst, and the predetermined third temperature threshold is set to a temperature at which the unburned fuel injected by the in-exhaust-pipe direct injection reacts on an oxidation catalyst. The term "a temperature indicative of a catalyst temperature" is used to represent a temperature for use in estimating a temperature of the catalyst, and a temperature of exhaust gas flowing to the catalyst, a temperature of exhaust gas flowing from the catalyst, or the like can be used.

This method makes it possible to prevent the unburned fuel injected either by the post-injection or by the in-exhaust-pipe direct injection from flowing in an unreacted state to a downstream side of the NOx occlusion reduction type catalyst.

To achieve the above object, an exhaust gas purification system is characterized by including: an exhaust gas purification apparatus in which exhaust gas of an internal combustion engine is purified when the exhaust gas is in a lean air-fuel ratio state, and in which purification capability is regenerated when the exhaust gas is in an rich air-fuel ratio state; and a control device which performs, in a supply control of unburned fuel for making the exhaust gas into a rich air-fuel ratio state, both post-injection by which post-injection is performed as in-cylinder injection and in-exhaust-pipe direct injection by which fuel is injected directly into the exhaust pipe.

In this exhaust gas purification system, the control device performs: the supply control of the unburned fuel by using the post-injection without using the in-exhaust-pipe direct injection, when an operating state of the internal combustion engine is under low load; the supply control of the unburned fuel by using both the post-injection and the in-exhaust-pipe direct injection, under medium load; and the supply control of the unburned fuel by using the in-exhaust-pipe direct injection without using the post-injection, under high load.

Moreover, in the supply control of the unburned fuel under medium load, the control device performs such a control that a target addition amount of unburned fuel to be added for making the exhaust gas into a rich air-fuel ratio state is calculated by dividing an intake air amount by a target air-fuel ratio calculated from the operating state of the internal combustion engine and then subtracting, from the divided value, a fuel flow amount required depending on the operating state of the internal combustion engine, a post-injection amount is calculated by calculating an addition amount ratio, which is a ratio between the post-injection amount and an in-exhaust-pipe direct injection amount, from the operating state of the internal combustion engine, and then multiplying the target addition amount by the addition amount ratio, the in-exhaust-pipe direct injection amount is calculated by subtracting the post-injection amount from the target addition amount, and the unburned fuel is supplied in the calculated post-injection amount and the calculated in-exhaust-pipe direct injection amount.

In addition, in the above exhaust gas purification system, the control device sets the addition amount ratio on the basis of a limit within which no generation of black smoke occurs when an EGR control and a post-injection control are simultaneously performed.

In addition, in the above exhaust gas purification system, the exhaust gas purification apparatus includes a NOx occlusion reduction type catalyst apparatus and an oxidation catalyst apparatus on an upstream side of the NOx occlusion reduction type catalyst apparatus, the control device: prohibits the post-injection when a first temperature indicative of a catalyst temperature of the NOx occlusion reduction type catalyst apparatus is at or below a predetermined first temperature threshold; and prohibits the in-exhaust-pipe direct injection when the first temperature is at or below a predetermined second temperature threshold, and a second temperature indicative of a catalyst temperature of the oxidation catalyst apparatus is at or below a predetermined third temperature threshold, and the predetermined first temperature threshold is set to a temperature at which the unburned fuel injected by the post-injection reacts on a NOx occlusion reduction type catalyst, the predetermined second temperature threshold is set to a temperature at which the unburned fuel injected by the in-exhaust-pipe direct injection reacts on a NOx occlusion catalyst, and the predetermined third temperature threshold is set to a temperature at which the unburned fuel injected by the in-exhaust-pipe direct injection reacts on an oxidation catalyst.

These exhaust gas purification systems allow implementation of the above-described method for controlling an exhaust gas purification system, and can achieve similar effects.

Effect of the Invention

In each of the method for controlling an exhaust gas purification system and the exhaust gas purification system according to the present invention, the post-injection control and the in-exhaust-pipe direct injection control are selectively used when the supply of unburned fuel is controlled for supplying the unburned fuel into exhaust gas, in an air-fuel ratio rich control performed during regeneration to recover the purification capability of an exhaust gas purification apparatus. Thereby, it is possible to supply the unburned fuel into the exhaust gas, while the combustion state in a cylinder is prevented from deterioration, and in-cylinder combustion is kept in a favorable state. Accordingly, it is possible to reduce both black smoke and white smoke, and also to suppress the increase in amount of PMs generated.

EXPLANATION OF REFERENCE NUMERALS

1 Exhaust gas purification system
10 Diesel engine (internal combustion engine)
11 Exhaust passage
12 Exhaust gas purification apparatus
12a Oxidation catalyst apparatus
12b NOx occlusion reduction type catalyst apparatus
12c Filter apparatus
13 In-exhaust-pipe-fuel-injection valve
14 Intake passage
16 MAF sensor (intake air amount sensor)
22 EGR valve
23 First exhaust gas temperature sensor
24 Second exhaust gas temperature sensor
25 NOx/excess air ratio sensor
30 Control device (ECM)

BEST MODES FOR CARRYING OUT THE INVENTION

Hereinafter, a method for controlling an exhaust gas purification system and an exhaust gas purification system of an embodiment according to the present invention will be described with reference to the drawings. Note that, here, the description will be made with reference to an exhaust gas purification system including an oxidation catalyst apparatus, a NOx occlusion reduction type catalyst apparatus, and a filter apparatus, in this order from the upstream side.

However, the present invention is not limited to this exhaust gas purification system, but is applicable to an exhaust gas purification system including an exhaust gas purification apparatus and a control device, configured as follows. In the exhaust gas purification apparatus, exhaust gas of an internal combustion engine is purified when the exhaust gas is in a lean air-fuel ratio state, and purification capability is regenerated when the exhaust gas is in a rich air-fuel ratio state. The control device performs, in a supply control of unburned fuel for making the exhaust gas into a rich air-fuel ratio state, both post-injection in which post-injection is performed as in-cylinder injection, and in-exhaust-pipe direct injection by which fuel is injected directly into an exhaust pipe.

Figure 1:
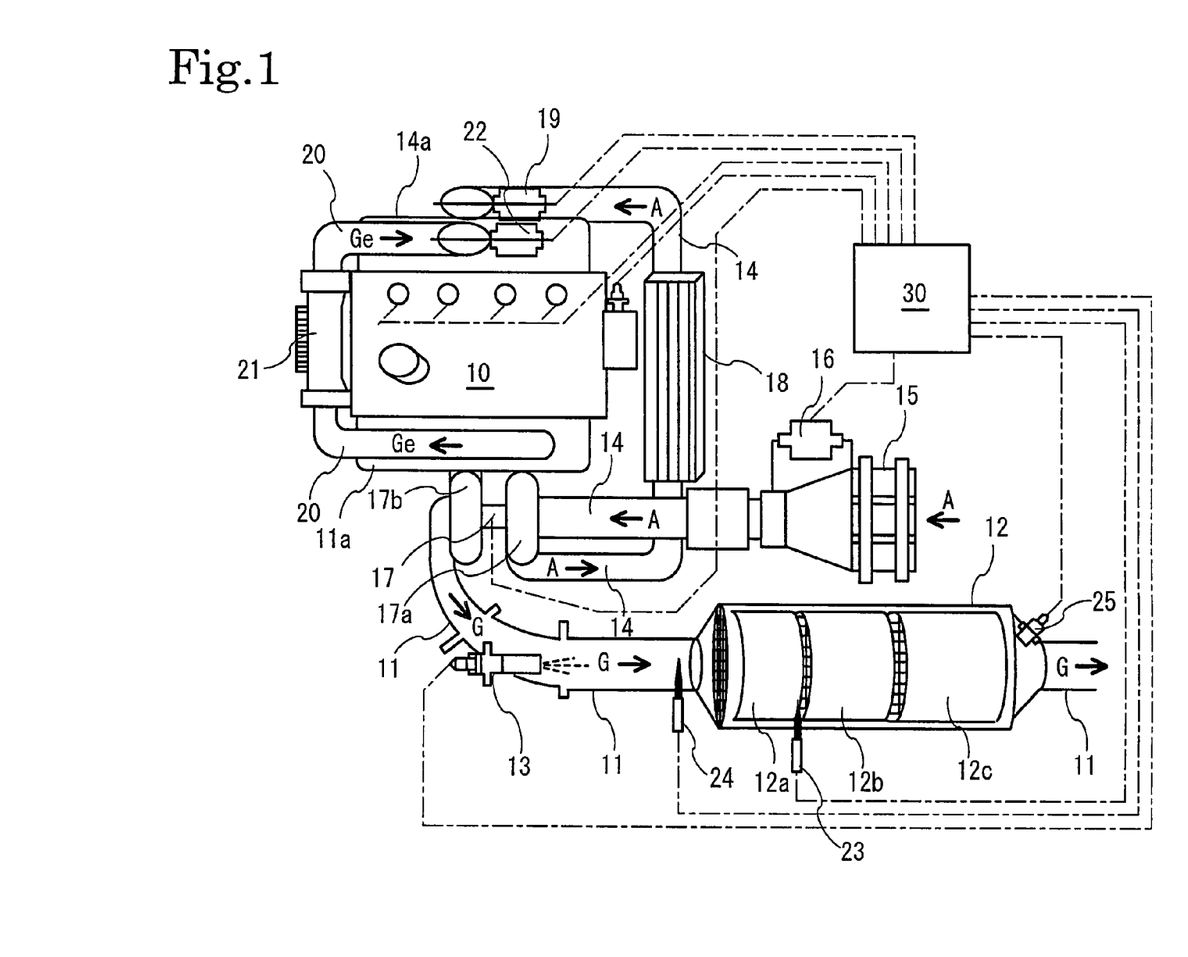
FIG. 1 is a diagram showing a configuration of an exhaust gas purification system of an embodiment according to the present invention.

FIG. 1 shows a configuration of an exhaust gas purification system 1 of the embodiment of the present invention. In this configuration, this exhaust gas purification system 1 is provided with an exhaust gas purification apparatus 12 in which an oxidation catalyst apparatus 12a, a NOx occlusion reduction type catalyst apparatus 12b, and a filter apparatus 12c are arranged in this order from an upstream side, on an exhaust passage 11 of a diesel engine (internal combustion engine) 10. On an upstream side of the exhaust gas purification apparatus 12, an in-exhaust-pipe-fuel-injection valve 13 is provided. Moreover, a turbine 17b of a turbocharger 17 is provided on an upstream side of the exhaust passage 11.

The oxidation catalyst apparatus 12a is formed by supporting an oxidation catalyst such as platinum onto a supporting member such as a honeycomb structure of a porous ceramic. Meanwhile, the NOx occlusion reduction type catalyst apparatus 12b Ls formed of a monolithic catalyst, and structured by providing a catalyst coat layer of aluminum oxide, titanium oxide, or the like onto a supporting member such as a cordierite honeycomb, and supporting a catalyst metal such as platinum (Pt), palladium (Pd), or rhodium (Rh), and a NOx occlusion material (NOx occlusion substance) such as barium (Ba), or potassium (K onto the catalyst coat layer.

When the NOx occlusion reduction type catalyst apparatus 12b is under a state where exhaust gas has a high oxygen concentration, i.e., under a lean air-fuel ratio state, the NOx occlusion material occludes NOx in the exhaust gas. Thereby, NOx in the exhaust gas is treated for purification. Meanwhile, the NOx occlusion reduction type catalyst apparatus 12b releases the occluded NOx, and reduces the released NOx by a catalytic action of the catalyst metal, under a state where an oxygen concentration of the exhaust gas is low or zero, i.e., under a rich air-fuel ratio state, or under a stoichiometric air-fuel ratio state. These prevent NOx from being emitted to the atmosphere.

The filter apparatus 12c is formed of a monolithic honeycomb type wall-flow type filter in which channels (passages for the exhaust gas) of a porous ceramic honeycomb are blocked alternately at inlets and at outlets. If necessary, a catalyst such as platinum or cerium oxide is supported on a filter portion of the filter apparatus 12c. PMs (particulate matters) in the exhaust gas are collected on porous ceramic walls of this filter apparatus 12c. For this filter apparatus 12c, an exhaust gas temperature raising control is performed to prevent increase in pressure loss due to an increased amount of PMs collected. In this exhaust gas temperature raising control, when the amount of PMs collected exceeds a predetermined collecting amount, or when a pressure difference between an upstream and a downstream of the filter apparatus 12c exceeds a predetermined amount of pressure difference, the temperature of the exhaust gas is raised, and thereby the temperature of the filter apparatus is raised to a temperature at or above a combustion temperature of the PMs. In this exhaust gas temperature raising control, an air-fuel ratio rich control including a supply control of unburned fuel is performed.

Meanwhile, the intake passage 14 is provided with an air cleaner 15, a MAF sensor (intake air amount sensor) 16, a compressor 17a of the turbocharger 17, an intercooler 18, and an intake throttle valve 19. Moreover, an EGR passage 20 is provided so as to connect an intake manifold 14a and an exhaust manifold 11a. This EGR passage 20 is provided with an EGR cooler 21 and an EGR valve 22.

Moreover, in order to control this exhaust gas purification system 1, a first exhaust gas temperature sensor 23 is provided between the oxidation catalyst apparatus 12a and the NOx occlusion reduction type catalyst apparatus 12b, and a second exhaust gas temperature sensor 24 is provided on an upstream side of the oxidation catalyst apparatus 12a. Meanwhile, a NOx/excess air ratio sensor 25 is provided on a downstream side of the filter apparatus 12c.

A control device (ECM: engine control module) 30 is provided which receives inputs of values measured with these sensors 23, 24, and 25, as well as an engine speed Ne, a fuel flow amount (or load) Q, a cooling water temperature, an intake air amount Va, and the like which show an operating status of the diesel engine 10, and controls the engine 10, the turbocharger 17, the in-exhaust-pipe-fuel-injection valve 13, and the like.

This control device 30 performs an overall control of the engine 10, as well as a regeneration control (hereinafter referred to as a NOx regeneration control) to recover a NOx purification capability of the NOx occlusion reduction type catalyst apparatus 12b, a sulfur purge control for recovery from sulfur poisoning, and another regeneration control (hereinafter referred to as a PM regeneration control) to remove PMs on the filter apparatus 12c by combustion. This control device 30 outputs control signals, with which a fuel injection control of the engine, the turbocharger 17, the intake throttle valve 19, the EGR valve 22, the in-exhaust-pipe-fuel-injection valve 13, and the like are controlled.

Next, a method for controlling the above-described exhaust gas purification system 1 will be described. In this control method, the control device 30 performs the following supply control of unburned fuel in the NOx regeneration control to recover the NOx purification capability originating from the NOx occlusion capability of the NOx occlusion reduction type catalyst apparatus 12b, the sulfur purge control to recover the NOx purification capability deteriorated due to sulfur poisoning, the PM regeneration control to recover the PM purification capability by removing PMs collected onto the filter apparatus 12c by combustion, and the like.

Figure 2:
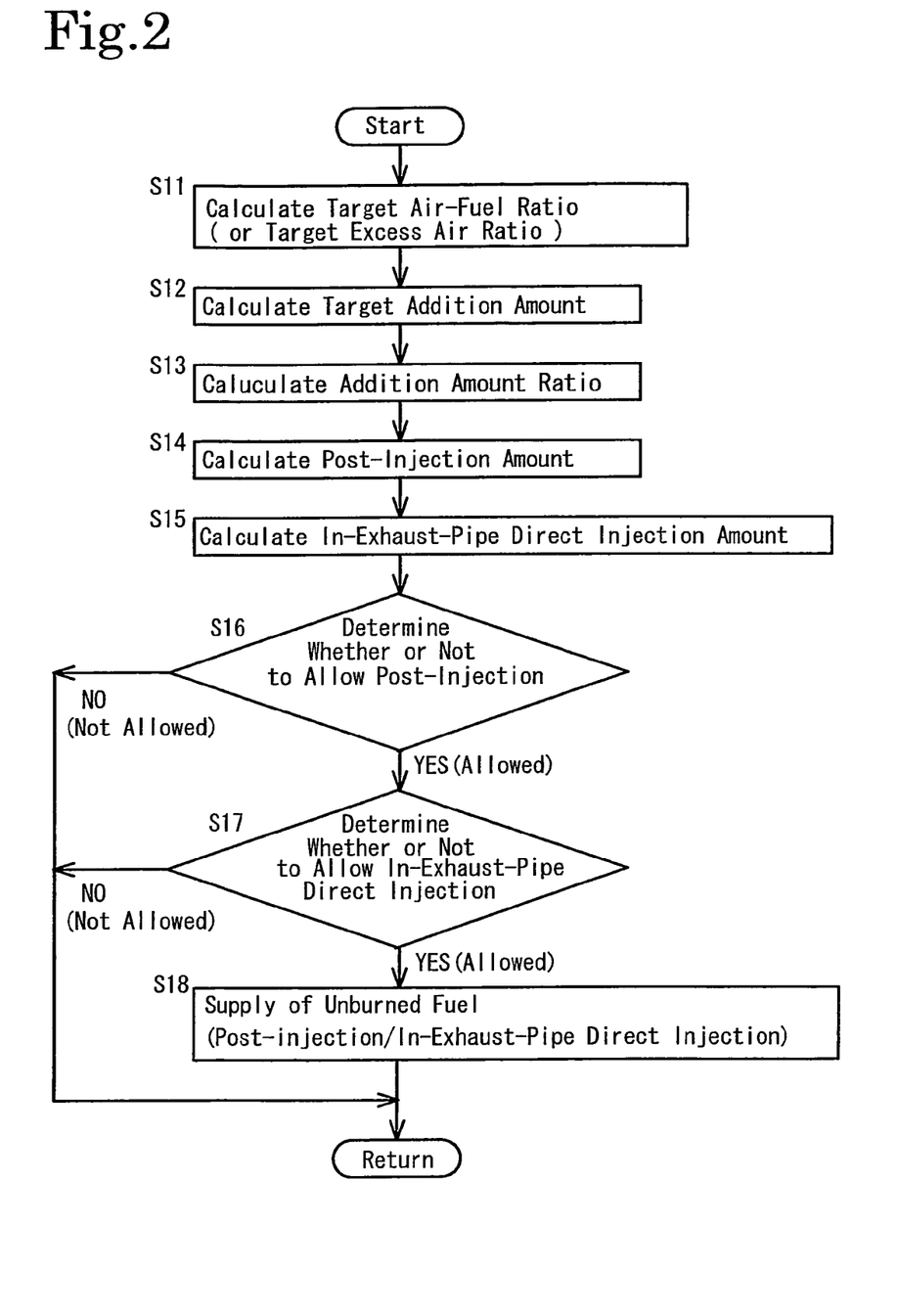
FIG. 2 is a control flow diagram showing a supply control of unburned fuel in a method for controlling an exhaust gas purification system of the embodiment according to the present invention.

In addition, the supply control of unburned fuel in the present invention is performed in accordance with a control flow shown in FIG. 2. The control flow in FIG. 2 is shown as a control flow which is selected, when it is determined in a higher control flow that an air-fuel ratio rich control is necessary and that the supply control of unburned fuel is necessary. A sequence which involves selecting and executing this control flow and returning the process to the higher flow is repeated, as long as this control is determined to be necessary.

When the control flow in FIG. 2 is initiated, in a first Step S11 of calculating a target air-fuel ratio (or a target excess air ratio $\lambda t$), a target air-fuel ratio At (or a target excess air ratio At) is calculated with reference to a first map data on the basis of an engine speed Ne, and a fuel flow amount Q. This fuel flow amount Q is an amount of fuel necessary for the engine 10 to generate a demanded output in a normal driving.

The target air-fuel ratio At (or the target excess air ratio $\lambda t$) is an air-fuel ratio (or an excess air ratio) required in a supply control of unburned fuel of this time, and is approximately 0.85 to 0.95, in terms of value of the excess air ratio $\lambda$, in an ordinary air-fuel ratio rich control. This first map data are data showing a target air-fuel ratio (or excess air ratio) on the basis of the engine revolution number Ne and the fuel flow amount Q, and are data preset on the basis of a result of a bench test or the like.

Next, in Step S12 of calculating a target addition amount, a target addition amount Qr required to achieve a rich atmosphere, i.e., a sum Qr of a post-injection amount Qp and an in-exhaust-pipe direct injection amount Qe is calculated from the intake air amount Va, the fuel flow amount Q, and a theoretical air-fuel ratio Ar. For the intake air amount Va, a value measured with the MAF sensor 16 is used. For this calculation, the following relationship is used: the target air-fuel ratio At =the intake air amount/the total fuel amount =the intake air amount Va/(the target addition amount Qr+the fuel flow amount Q). From this, obtained is the target addition amount Qr=the intake air amount Va/the target air-fuel ratio At−the fuel flow amount Q. In other words, the target addition amount Qr is a value (difference) (Va/At−Q) obtained by subtracting the fuel flow amount Q from a value (quotient) (Va/At) obtained by dividing the intake air amount Va by the target air-fuel ratio At.

Meanwhile, when the target excess air ratio λt is used, additionally used is the following relationship: the target excess air ratio λt=the target air-fuel ratio At/the theoretical air-fuel ratio Ar. Specifically, since the target air-fuel ratio At=the target excess air ratio λt×the theoretical air-fuel ratio Ar, the target addition amount Qr=(the intake air amount Va/(the target excess air ratio λt×the theoretical air-fuel ratio Ar))−the fuel flow amount Q=(Va/(λt×Ar)−Q). In other words, the target addition amount Qr is found as a value (difference) obtained by subtracting the fuel flow amount Q required depending on a operating state of the engine 10 from a value (quotient) (Va/(λt×Ar)) obtained by dividing the intake air amount Va by a value (product) (λt×Ar) obtained by multiplying the target excess air ratio λt by the theoretical air-fuel ratio Ar. This theoretical air-fuel ratio Ar is approximately 14.8 in diesel engines.

Next, in Step S13 of calculating an addition amount ratio, an addition amount ratio Rp, which is a ratio (Qp/Qr) between the post-injection amount Qp and the target addition amount Qr (=Qp+Qe), is calculated. In this calculation of the addition amount ratio Rp, the addition amount ratio Rp is calculated with reference to a second map data on the basis of the engine speed Ne and the fuel flow amount (or load) Q. This second map data are data showing the addition amount ratio Rp on the basis of the engine speed Ne and the fuel flow amount Q, and are data preset on the basis of a result of a bench test or the like.

The addition amount ratio Rp in this second map data is as follows. When the operating state of the engine 10 is under low load, the addition amount ratio Rp satisfies Rp=1.0, so that the supply of unburned fuel is controlled by using the post-injection without using in-exhaust-pipe direct injection. Under medium load, the addition amount ratio Rp satisfies 1.0>Rp>0.0, so that the supply of unburned fuel is controlled by using both the post-injection and the in-exhaust-pipe direct injection. Under high load, the addition amount ratio Rp satisfies Rp=0.0, so that the supply of unburned fuel is controlled by using the in-exhaust-pipe direct injection without using post-injection.

The addition amount ratio Rp under the medium load is set on the basis of a limit within which no black smoke is generated when the EGR control and the post-injection control are simultaneously performed. This limit of black smoke generation is determined experimentally, and, on the basis of the data, the second map data showing the addition amount ratio Rp between the post-injection amount Qp and the in-exhaust-pipe direct injection amount Qe is formed. This second map data is a three-dimensional map based on the engine speed Ne and the fuel flow amount Q.

Incidentally, this addition amount ratio Rp is based on the limit within which no black smoke is generated by the EGR and the post-injection in a predetermined engine operating state. The state of such black smoke generation is determined by a combustion temperature in a cylinder. However, the combustion temperature is difficult to detect. Hence, by use of an EGR ratio, an exhaust gas temperature, and an EGR gas temperature, instead of the combustion temperature, the addition amount ratio Rp may be calculated from the EGR ratio and the exhaust gas temperature. For example, in a range where the EGR ratio is 50% or more to 60% or more, and where the EGR temperature is 200° C. or less to 250° C. or less, the EGR and the post-injection can be performed, while the generation of black smoke is suppressed.

With this, since the unburned fuel supplied to the catalyst by the post-injection is decomposed to some extent, to become reactive HC gas, the unburned fuel reacts on the catalyst rapidly. Meanwhile, the unburned fuel supplied to the catalyst by the in-exhaust-pipe injection is first decomposed on the catalyst, and then reacts. Hence, such unburned fuel requires an atmosphere with a higher temperature, and moreover the catalytic reaction is slow. In this method, since the post-injection has priority over the in-exhaust-pipe direct injection, the unburned fuel can be catalytically reacted efficiently, while generation of black smoke is avoided.

In next Step S14 of calculating a post-injection amount, the post-injection amount Qp is calculated. This post-injection amount Qp is calculated as "the target addition amount Qr×the addition amount ratio Rp" (=Qr×Rp). In other words, the post-injection amount Qp is calculated as a value (product) obtained by multiplying the target addition amount Q by the addition amount ratio Rp.

In next Step S15 of calculating an in-exhaust-pipe direct injection amount, the in-exhaust-pipe direct injection amount Qe is calculated. This in-exhaust-pipe direct injection amount Qe is calculated as "the target addition amount Qr−post-injection amount Qp" (=Qr−Qp). In other words, the in-exhaust-pipe direct injection amount Qe is calculated as a value (difference) obtained by subtracting the post-injection amount Qp from the target addition amount Qr.

In subsequent Step 16 of determining whether or not to allow the post-injection on the basis of an exhaust gas temperature and in Step S17 of determining whether or not to allow the in-exhaust-pipe direct injection on the basis of an exhaust gas temperature, whether or not to prohibit the post-injection is determined on the basis of a first exhaust gas temperature T1, and whether or not to prohibit the in-exhaust-pipe direct injection is determined on the basis of a second exhaust gas temperature T2. This first exhaust gas temperature T1 is a temperature indicative of a catalyst temperature in the NOx occlusion reduction type catalyst apparatus 12b, and is a temperature detected by the first exhaust gas temperature sensor 23. Meanwhile, the second exhaust gas temperature T2 is a temperature indicative of a catalyst temperature in the oxidation catalyst apparatus 12a, and is a temperature detected by the second exhaust gas temperature sensor 24.

The determination of the prohibition of the post-injection and the determination of the prohibition of in-exhaust-pipe direct injection proceed as follows. In Step S16 of determining whether or not to allow the post-injection, whether or not to prohibit fuel addition by the post- injection is determined. As for the post-injection, when the first exhaust gas temperature T1 detected by the first exhaust gas temperature sensor 23 is higher than a predetermined first temperature threshold T1$a$ (YES), the post-injection is determined to be allowed, and the process goes to Step S17. Meanwhile, when the first exhaust gas temperature T1 is at or below the predetermined first temperature threshold T1$a$ (NO), the post-injection is determined not to be allowed, and the process goes to "RETURN".

In next Step S17 of determining whether or not to allow the in-exhaust-pipe direct injection, whether or not to prohibit fuel addition by the in-exhaust-pipe direct injection is determined. As for the in-exhaust-pipe direct injection, when the first exhaust gas temperature T1 is higher than the predetermined second temperature threshold T1$b$, and the second exhaust gas temperature T2 detected by the second exhaust gas temperature sensor 24 is higher than a predetermined third temperature threshold T2$a$ (YES), the in-exhaust-pipe direct injection is allowed, and the process goes to Step S18. Meanwhile, when the first exhaust gas temperature T1 is at or below the predetermined second temperature threshold T1$b$, or when the second exhaust gas temperature T2 is at or below the predetermined third temperature threshold T2$a$ (NO), the in-exhaust-pipe direct injection is determined not to be allowed, and the process goes to "RETURN".

This predetermined first temperature threshold T1$a$ and this predetermined second temperature threshold T1$b$ are temperatures at which the catalyst in the NOx occlusion reduction type catalyst apparatus 12$b$ is activated. The predetermined third temperature threshold T2$a$ is a temperature at which the catalyst in the oxidation catalyst apparatus 12$a$ is activated. If the temperatures are at or below a corresponding one of these temperature thresholds T1$a$, T1$b$, and T2$a$, the unburned fuel flows to the downstream side without undergoing the catalytic reaction, forming white smoke.

This predetermined first temperature thresholds T1$a$ and this predetermined second temperature threshold T2$a$ show limit values of white smoke in the same NOx occlusion reduction type catalyst apparatus 12$b$. The former is a temperature at which the unburned fuel starts the catalytic reaction in the post-injection where unburned fuel is more easily decomposed. The latter is a temperature at which the unburned fuel starts the catalytic reaction in the in-exhaust-pipe direct injection. Note that since the difference between the two is small, the same value may be used for the two for the convenience of control. Meanwhile, the predetermined third temperature threshold T2$a$ shows a limit value of white smoke in the in-exhaust-pipe direct injection in the oxidation catalyst apparatus 12$a$.

These temperature thresholds T1$a$, T1$b$, and T2$a$ are calculated from three-dimensional third, fourth, and fifth map data based on the engine speed Ne, and the fuel flow amount (or the load) Q. In addition, these thresholds T1$a$, T1$b$, and T2$a$ take values of approximately 200° C. to 250° C.

Since the supply of unburned fuel is prohibited in these Step S16 and Step S17, no unburned fuel is supplied under a state where the catalyst temperature is still low because of rapid acceleration or the like, i.e., in a case where the load is high, but the catalyst temperature is low. Therefore, the generation of white smoke can be prevented.

In next Step S18, unburned fuel is supplied for a predetermined time (a time related to an interval of successive controls) by any one of or both of the post-injection and the in-exhaust-pipe direct injection in the post-injection amount Qp and the in-exhaust-pipe direct injection amount Qe. Thereafter, the process goes to "RETURN".

After this "RETURN, " if a state continues where the supply control of unburned fuel in FIG. 2 is required because of a regeneration control or the like, the supply control of unburned fuel is selected again after the higher control flow, and Step S11 to Step S16, Step S17, or Step S18 are repeatedly executed. If the operating state of the engine 10 changes or the air-fuel ratio rich control proceeds, the state where the supply control of unburned fuel is necessary changes to a state where the supply control of unburned fuel is unnecessary. This change causes interruption to the control flow in FIG. 2, although the interruption is not shown in FIG. 2. Then, a termination process is conducted if necessary, and the process goes to "RETURN." Thus, the control flow of FIG. 2 is terminated. Thereafter, until another necessity is generated, the control flow in FIG. 2 is not selected.

This control method enables the following controls. When the operating state of the engine (internal combustion engine) 10 is under low load, the supply of unburned fuel is controlled by using the post-injection without using in-exhaust-pipe direct injection. Under medium load, the supply of unburned fuel is controlled by using both the post-injection and the in-exhaust-pipe direct injection. Under high load, the supply of unburned fuel is controlled by using the in-exhaust-pipe direct injection without using post-injection.

Simultaneously, in the supply control of unburned fuel under medium load, the target addition amount Qr of unburned fuel to be added to make the exhaust gas into a rich air-fuel ratio state is calculated by dividing the intake air amount Va by the target air-fuel ratio At calculated from the operating state of the engine 10 and then subtracting, from the value obtained by this division, the fuel flow amount Q required depending on the operating state of the engine 10. The addition amount ratio Rp, which is a ratio between the post-injection, amount Qp and the in-exhaust-pipe direct injection amount Qe, is calculated from the operating state of the engine 10. The post-injection amount Qp is calculated by multiplying the target addition amount Qr by this addition amount ratio Rp. The in-exhaust-pipe direct injection amount Qe is calculated by subtracting the post-injection amount Qp from the target addition amount Qr. Thereby, it is possible to supply the unburned fuel in the calculated post-injection amount Qp and in-exhaust-pipe direct injection amount Qe.

Specifically, under low load, the unburned fuel is supplied by the post-injection with which white smoke is less likely to be generated, whereas, under high load, the unburned fuel is supplied by the in-exhaust-pipe direct injection with which black smoke less likely to be generated. Moreover, in a medium load region where the post-injection and the in-exhaust-pipe direct injection are switched between each other, the two are used simultaneously, and gradually switched from one to the other with a ramp. Thereby, generation of both white smoke black smoke can be suppressed.

Figure 3:
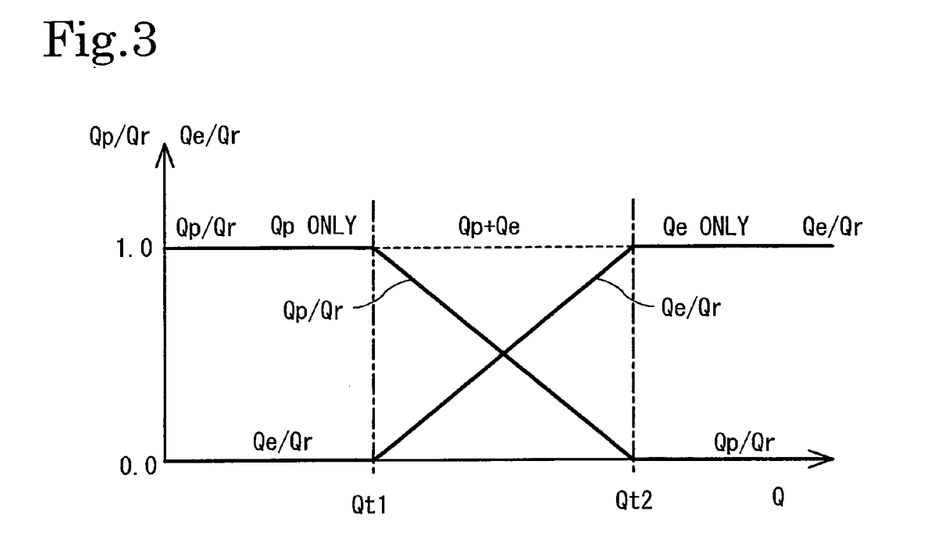
FIG. 3 is a diagram showing a relationship between a post-injection amount and an in-exhaust-pipe direct injection amount during increase in fuel flow amount.
Figure 4:
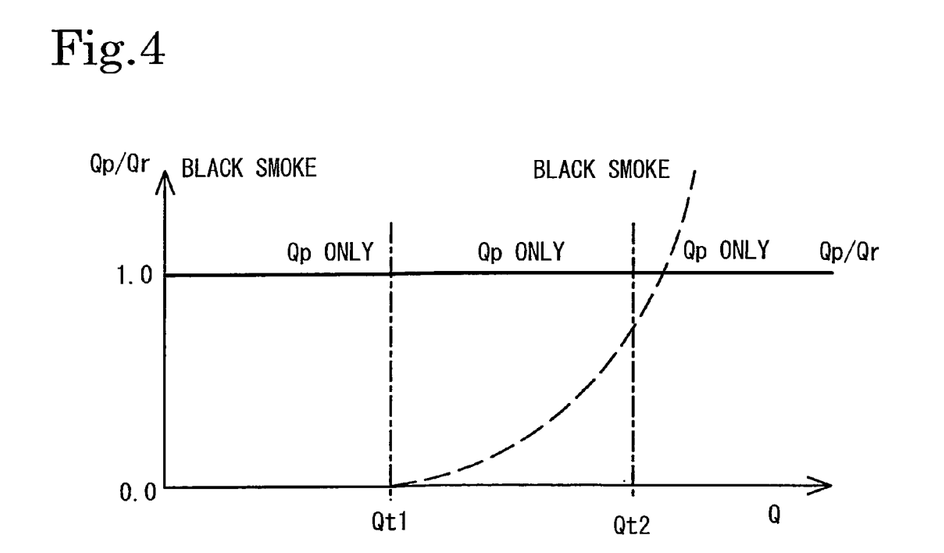
FIG. 4 is a diagram schematically showing generation of black smoke in a case where only post-injection is used as a countermeasure during increase in fuel flow amount.
Figure 5:
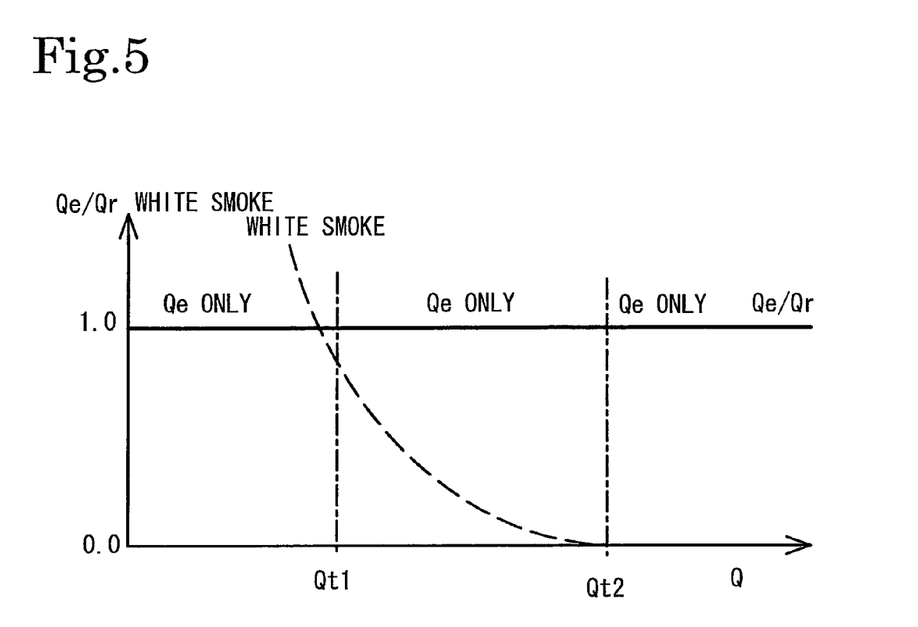
FIG. 5 is a diagram schematically showing generation of white smoke in a case where only in-exhaust-pipe direct injection is used as a countermeasure during increase in fuel flow amount.

An effect of the combined use of the post-injection and the in-exhaust-pipe direct injection under medium load will be described with reference to FIG. 3 to FIG. 5. FIG. 3 shows a case where the combined use of the post-injection and the in-exhaust-pipe direct injection is employed. FIG. 4 shows a case where only the post-injection is performed, and where no in-exhaust-pipe direct injection is performed. FIG. 5 shows a case where only the in-exhaust-pipe direct injection is performed, and where no post-injection is performed. In each case, the horizontal axis represents the fuel flow amount Q related to an amount of torque generated in the engine 10 (load). The vertical axes represents "the post-injection amount Qp/the target addition amount Qr" and "the in-exhaust-pipe direct injection amount Qe/the target addition amount Qr" in FIG. 3, "Qp/Qr" and "an amount of black smoke generated" in FIG. 4, and "Qe/Qr" and "an amount of white smoke generated" in FIG. 5.

In FIG. 3, initially, only the post-injection amount Qp is used as a countermeasure to the increasing fuel flow amount Q. After the fuel flow amount Q reaches the limit Qt1 over which black smoke is generated, a proportion of the post-injection amount Qp is reduced, and the in-exhaust-pipe direct injection amount Qe is increased. After the fuel flow amount Q exceeds the limit Qt2 over which white smoke is generated, only the in-exhaust-pipe direct injection amount Qe is used as the countermeasure. In this case, in a range of "Qp+Qe" within which both types of injection is performed, generation of white smoke and black smoke is observed to some extent. Note that FIG. 3 does not show the amounts of white smoke and black smoke generated.

Meanwhile, as shown in FIG. 4, when only the post-injection amount Qp is used as the countermeasure, as the fuel flow amount Q increases, generation of black smoke is observed at and after the limit Qt1 over which black smoke is generated. Meanwhile, as shown in FIG. 5, in a case where only the in-exhaust-pipe direct injection is used as the countermeasure, when the fuel flow amount Q is small, the temperature of the exhaust gas is low, which leads to generation of white smoke. Accordingly, until the limit Qt2 within which white smoke is generated, generation of white smoke is observed.

Accordingly, in each of the above-described method for controlling an exhaust gas purification system and the above-described exhaust gas purification system 1, the post-injection control and the in-exhaust-pipe direct injection control are selectively used when the supply of unburned fuel is controlled for supplying the unburned fuel into exhaust gas, in an air-fuel ratio rich control performed during regeneration to recover the purification capability of the exhaust gas purification apparatus 12. Thereby, it is possible for the system to supply the unburned fuel into the exhaust gas while in-cylinder combustion is kept in a favorable state with the combustion state in the cylinder prevented from deterioration. Accordingly, it is possible to reduce both black smoke and white smoke, and also to suppress the increase in amount of PMs generated.

Moreover, since the post-injection amount and the in-exhaust-pipe direct injection amount are found from an actual intake air amount and an actual fuel amount, it is only necessary to change the target air-fuel ratio At while an amount reduced with the NOx occlusion reduction type catalyst or the like and other factors are checked. For this reason, it becomes easy to optimize the post-injection amount Qp and the in-exhaust-pipe direct injection amount Qe. Regarding the post-injection amount Qp and the in-exhaust-pipe direct injection amount Qe, when the addition amount ratio Rp and the target air-fuel ratio At are changed, a ratio of three parameters of black smoke, white smoke, and drivability (ride comfort) due to change in engine output changes. However, since the change in target air-fuel ratio At does not affect parameters other than the three parameters, a phenomenon that the addition amount Qr becomes so small that NOx cannot be reduced and similar phenomena do not occur.

Industrial Applicability

The method for controlling an exhaust gas purification system and the exhaust gas purification system of the present invention having the above-described excellent effects can be used extremely effectively in exhaust gas purification systems, such as NOx occlusion reduction type catalysts and diesel particulate filters (DPF), provided to internal combustion engines and the like mounted on vehicles.

What is claimed is:

1. A method for controlling an exhaust gas purification system including an exhaust gas purification apparatus in which exhaust gas of an internal combustion engine is purified when the exhaust gas is in a lean air-fuel ratio state, and in which purification capability is regenerated when the exhaust gas is in a rich air-fuel ratio state, the method for controlling an exhaust gas purification system comprising performing, in a supply control of unburned fuel for making the exhaust gas into the rich air-fuel ratio state, both post-injection by which post-injection is performed as in-cylinder injection and in-exhaust-pipe direct injection by which fuel is injected directly into the exhaust pipe, including controlling, when an operating state of the internal combustion engine is under low load, the supply of the unburned fuel by using the post-injection without using the in-exhaust-pipe direct injection, controlling, when the operating state of the internal combustion engine is under medium load, the supply of the unburned fuel by using both the post-injection and the in-exhaust-pipe direct injection, controlling, when the operating state of the internal combustion engine is under high load, the supply of unburned fuel by using the in-exhaust-pipe direct injection without using the post-injection, and in the supply control of the unburned fuel under medium load, calculating a target addition amount of unburned fuel to be added for making the exhaust gas into the rich air-fuel ratio state by dividing an intake air amount by a target air-fuel ratio calculated from the operating state of the internal combustion engine, and by then subtracting, from the divided value, a fuel flow amount required depending on the operating state of the internal combustion engine, calculating a post-injection amount by calculating an addition amount ratio, which is a ratio between the post-injection amount and an in-exhaust-pipe direct injection amount, from the operating state of the internal combustion engine, and by then multiplying the target addition amount by the addition amount ratio, calculating the in-exhaust-pipe direct injection amount by subtracting the post-injection amount from the target addition amount, and supplying the unburned fuel in the calculated post-injection amount and the calculated in-exhaust-pipe direct injection amount.

2. The method for controlling an exhaust gas purification system according to claim 1, further comprising setting the addition amount ratio on the basis of a limit within which no generation of black smoke occurs when an EGR control and a post-injection control are simultaneously performed.

3. The method for controlling an exhaust gas purification system according to claim 1, further comprising providing the exhaust gas purification apparatus with a NOx occlusion reduction type catalyst apparatus and an oxidation catalyst apparatus on an upstream side of the NOx occlusion reduction type catalyst apparatus, prohibiting, when a first temperature indicative of a catalyst temperature of the NOx occlusion reduction type catalyst apparatus is at or below a predetermined first temperature threshold, the post-injection, prohibiting, when the first temperature is at or below a predetermined second temperature threshold, and a second temperature indicative of a catalyst temperature of the oxidation catalyst apparatus is at or below a predetermined third temperature threshold, the in-exhaust-pipe direct injection, and setting the predetermined first temperature threshold to a temperature at which the unburned fuel injected by the post-injection reacts on the NOx occlusion reduction type catalyst, the predetermined second temperature threshold to a temperature at which the unburned fuel injected by the in-exhaust-pipe direct injection reacts on the NOx occlusion reduction type catalyst, and the predetermined third temperature threshold to a temperature at which the unburned fuel injected by the in-exhaust-pipe direct injection reacts on the oxidation catalyst.

4. The method for controlling an exhaust gas purification system according to claim 2, wherein
the exhaust gas purification apparatus includes a NOx occlusion reduction type catalyst apparatus and an oxidation catalyst apparatus on an upstream side of the NOx occlusion reduction type catalyst apparatus,
prohibiting, when a first temperature indicative of a catalyst temperature of the NOx occlusion reduction type catalyst apparatus is at or below a predetermined first temperature threshold, the post-injection,
prohibiting, when the first temperature is at or below a predetermined second temperature threshold, and a second temperature indicative of a catalyst temperature of the oxidation catalyst apparatus is at or below a predetermined third temperature threshold, the in-exhaust-pipe direct injection, and
setting the predetermined first temperature threshold to a temperature at which the unburned fuel injected by the post-injection reacts on the NOx occlusion reduction type catalyst, the predetermined second temperature threshold to a temperature at which the unburned fuel injected by the in-exhaust-pipe direct injection reacts on the NOx occlusion reduction type catalyst, and the predetermined third temperature threshold to a temperature at which the unburned fuel injected by the in-exhaust-pipe direct injection reacts on the oxidation catalyst.

5. An exhaust gas purification system comprising:
an exhaust gas purification apparatus in which exhaust gas of an internal combustion engine is purified when the exhaust gas is in a lean air-fuel ratio state, and in which purification capability is regenerated when the exhaust gas is in a rich air-fuel ratio state; and
a control device which includes programming, which when executed performs, in a supply control of unburned fuel for making the exhaust gas into the rich air-fuel ratio state, both post-injection by which post-injection is performed as in-cylinder injection and in-exhaust-pipe direct injection by which fuel is injected directly into the exhaust pipe, the exhaust gas purification system, wherein
the control device includes programming, which when executed performs:
the supply control of the unburned fuel by using the post-injection without using the in-exhaust-pipe direct injection, when an operating state of the internal combustion engine is under low load;
the supply control of the unburned fuel by using both the post-injection and the in-exhaust-pipe direct injection, under medium load; and
the supply control of the unburned fuel by using the in-exhaust-pipe direct injection without using the post-injection, under high load, and
in the supply control of the unburned fuel under medium load, the control device includes programming, which when executed performs such a control that
a target addition amount of unburned fuel to be added for making the exhaust gas into the rich air-fuel ratio state is calculated by dividing an intake air amount by a target air-fuel ratio calculated from the operating state of the internal combustion engine and then subtracting, from the divided value, a fuel flow amount required depending on the operating state of the internal combustion engine,
a post-injection amount is calculated by calculating an addition amount ratio, which is a ratio between the post-injection amount and an in-exhaust-pipe direct injection amount, from the operating state of the internal combustion engine, and then multiplying the target addition amount by the addition amount ratio,
the in-exhaust-pipe direct injection amount is calculated by subtracting the post-injection amount from the target addition amount, and
the unburned fuel is supplied in the calculated post-injection amount and the calculated in-exhaust-pipe direct injection amount.

6. The exhaust gas purification system according to claim 5, wherein
the control device includes programming, which when executed sets the addition amount ratio on the basis of a limit within which no generation of black smoke occurs when an EGR control and a post-injection control are simultaneously performed.

7. The exhaust gas purification system according to claim 5, wherein
the exhaust gas purification apparatus includes a NOx occlusion reduction type catalyst apparatus and an oxidation catalyst apparatus on an upstream side of the NOx occlusion reduction type catalyst apparatus,
the control device includes programming, which when executed prohibits the post-injection when a first temperature indicative of a catalyst temperature of the NOx occlusion reduction type catalyst apparatus is at or below a predetermined first temperature threshold; and prohibits the in-exhaust-pipe direct injection when the first temperature is at or below a predetermined second temperature threshold, and a second temperature indicative of a catalyst temperature of the oxidation catalyst apparatus is at or below a predetermined third temperature threshold, and
the predetermined first temperature threshold is set to a temperature at which the unburned fuel injected by the post-injection reacts on a NOx occlusion reduction type catalyst, the predetermined second temperature threshold is set to a temperature at which the unburned fuel injected by the in-exhaust-pipe direct injection reacts on a NOx occlusion reduction type catalyst, and the predetermined third temperature threshold is set to a temperature at which the unburned fuel injected by the in-exhaust-pipe direct injection reacts on an oxidation catalyst.

8. The exhaust gas purification system according to claim 6, wherein
the exhaust gas purification apparatus includes a NOx occlusion reduction type catalyst apparatus and an oxidation catalyst apparatus on an upstream side of the NOx occlusion reduction type catalyst apparatus,
the control device includes programming, which when executed prohibits the post-injection when a first temperature indicative of a catalyst temperature of the NOx occlusion reduction type catalyst apparatus is at or below a predetermined first temperature threshold; and prohibits the in-exhaust-pipe direct injection when the first temperature is at or below a predetermined second temperature threshold, and a second temperature indicative of a catalyst temperature of the oxidation catalyst apparatus is at or below a predetermined third temperature threshold, and the predetermined first temperature threshold is set to a temperature at which the unburned fuel injected by the post-injection reacts on a NOx occlusion reduction type catalyst, the predetermined second temperature threshold is set to a temperature at which the unburned fuel injected by the in-exhaust-pipe direct injection reacts on a NOx occlusion reduction type catalyst, and the predetermined third temperature threshold is set to a temperature at which the unburned fuel injected by the in-exhaust-pipe direct injection reacts on an oxidation catalyst.

\* \* \* \* \*